(12) United States Patent
Nayler

(10) Patent No.: US 6,819,760 B1  
(45) Date of Patent: Nov. 16, 2004

(54) ADAPTIVE ENERGY DETECTOR GAIN CONTROL IN PHYSICAL LAYER TRANSCEIVER FOR HOME TELEPHONE WIRE NETWORK

(75) Inventor: Colin Nayler, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/336,711

(22) Filed: Jun. 21, 1999

(51) Int. Cl.[7] .................................... H04M 1/00; H04M 9/00
(52) U.S. Cl. ............. 379/390.01; 379/394; 379/395.01; 379/398
(58) Field of Search .................................. 379/394, 395, 379/395.01, 390.01, 390.03, 398, 399.01, 400, 403–404

(56) References Cited

U.S. PATENT DOCUMENTS

| | | | |
|---|---|---|---|
| 5,319,702 A | * | 6/1994 | Kitchin et al. ............... 379/189 |
| 5,369,500 A | * | 11/1994 | Jacobs |
| 5,696,790 A | | 12/1997 | Graham et al. |
| 5,822,384 A | * | 10/1998 | Thebault et al. |

FOREIGN PATENT DOCUMENTS

| | | | |
|---|---|---|---|
| JP | 358139035 A | * | 8/1983 |
| JP | 404301540 A | * | 10/1992 |
| WO | WO 98/10554 | | 3/1998 |
| WO | WO 98/20649 | | 5/1998 |

* cited by examiner

Primary Examiner—Duc Nguyen

(57) ABSTRACT

A novel physical layer transceiver is provided for receiving data transmitted via residential wiring. The transceiver includes an input circuit for receiving an incoming pulse signal, and an energy detector responsive to the incoming pulse signal for producing a pulse energy value representing energy of the incoming pulse signal. An adaptive energy detector gain control circuit is responsive to the pulse energy value for adaptively controlling gain of the energy detector so as to maintain the pulse energy value at a predetermined level. The gain of the energy detector is controlled in response to at least one of access identification pulses preceding data pulses to identify the transmitting station. The adaptive energy detector gain control circuit includes a comparator for comparing a pulse energy value produced by the energy detector with a preset threshold level, and a controller for supplying the energy detector with a gain control value. The controller reduces the gain of the energy detector if the pulse energy value exceeds the threshold level, and raises the gain of the energy detector if the pulse energy value is less than the threshold level.

20 Claims, 6 Drawing Sheets

ADAPTIVE ENERGY DETECTOR GAIN CONTROL IN PHYSICAL LAYER TRANSCEIVER FOR HOME TELEPHONE WIRE NETWORK

FIELD OF THE INVENTION

The present invention relates to network interfacing, and more particularly, to methods and systems for adaptively controlling the gain of an energy detector in a physical layer transceiver for data communications over existing residential telephone line wiring.

BACKGROUND ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home telephone wire network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard Plain Old Telephone System (POTS) telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of transmit data from the received pulse becomes substantially difficult.

Accordingly, it would be desirable to provide a physical layer transceiver capable of adaptively controlling characteristics of its reception circuitry in a home network environment to optimize processing of received pulses.

DISCLOSURE OF THE INVENTION

The present invention provides a novel network station for receiving data transmitted via residential wiring. The network station comprises an input circuit for receiving an incoming pulse signal, and an energy detector responsive to the incoming pulse signal for producing a pulse energy value representing energy of the incoming pulse signal. An adaptive energy detector gain control circuit is responsive to the pulse energy value for adaptively controlling the gain of the energy detector so as to maintain the pulse energy value at a predetermined level.

In accordance with a preferred embodiment of the invention, each packet received by the input circuit comprises a plurality of access identification pulses preceding data pulses to identify a transmitting network station. The adaptive energy detector gain control circuit is configured to control the gain of the energy detector in response to at least one of the access identification pulses.

Preferably, the adaptive energy detector gain control circuit may comprise a comparator for comparing a pulse energy value produced by the energy detector with a preset threshold level, and a controller for supplying the energy detector with a gain control value. In response to the output of the comparator, the controller reduces the gain of the energy detector if the pulse energy value exceeds the threshold level, and raises the gain of the energy detector if the pulse energy value is less than the threshold level.

For example, the energy detector may comprise an integrator for performing integration over time. The energy detector gain control circuit may be configured to adjust a value of an integrated signal produced by the integrator.

In accordance with a method of the present invention, the following steps are carried out for receiving data transmitted via residential wiring:

producing by an energy detector a pulse energy value representing energy of an incoming pulse signal, and adaptively controlling gain of the energy detector so as to maintain the pulse energy value at a predetermined level.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Figure 1:
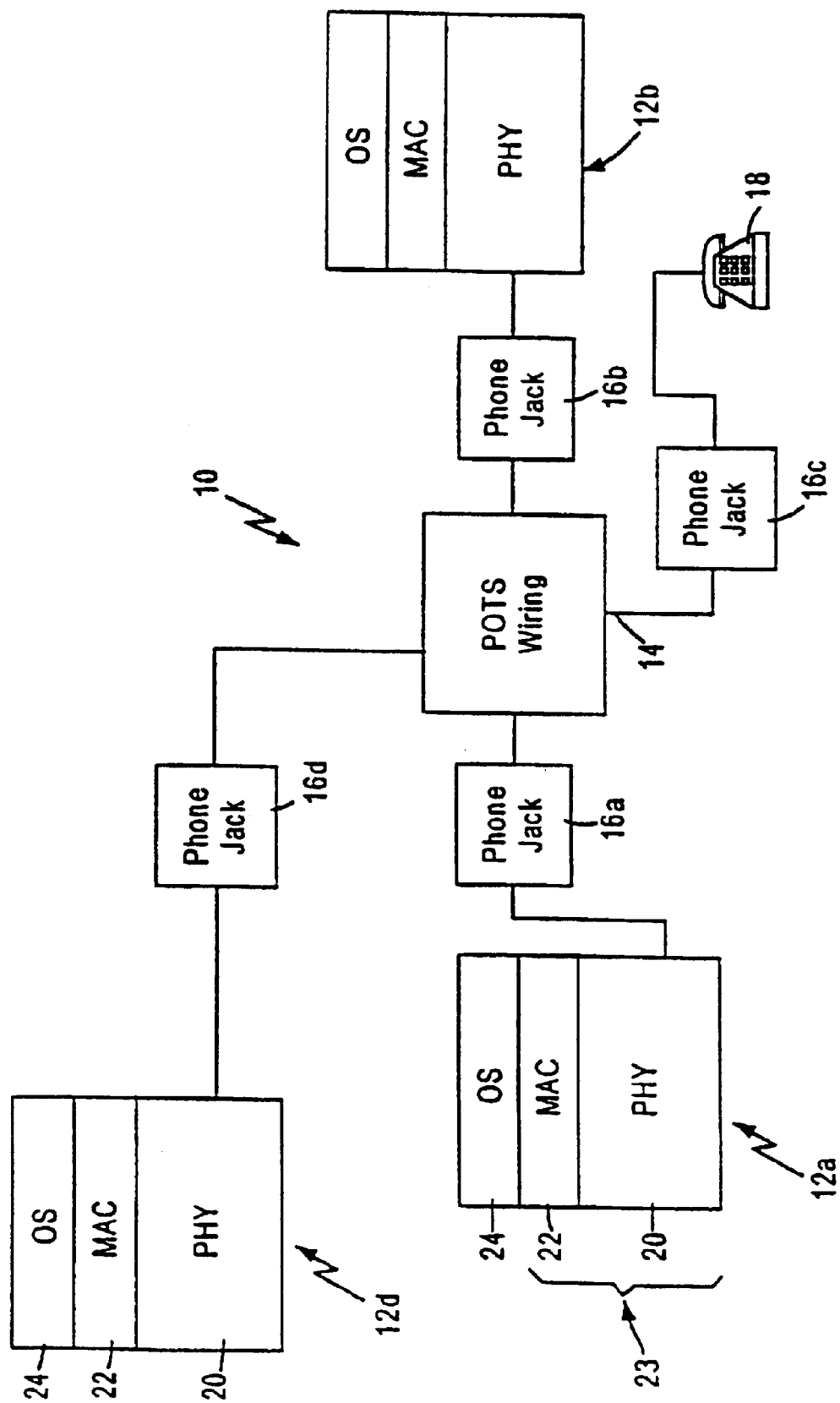
FIG. 1 is a block diagram illustrating a local area network deployed over residential twisted pair wiring.

FIG. 1 is a diagram of a home telephone wire network 10 according to an embodiment of the invention, using existing residential wiring such as twisted pair telephone line wiring as network media. As shown in FIG. 1, the network 10 supporting the Ethernet (IEEE 802.3) standard includes network stations 12a and 12b that are connected to a twisted pair telephone line wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer function according to the OSI reference model.

Figure 2A:
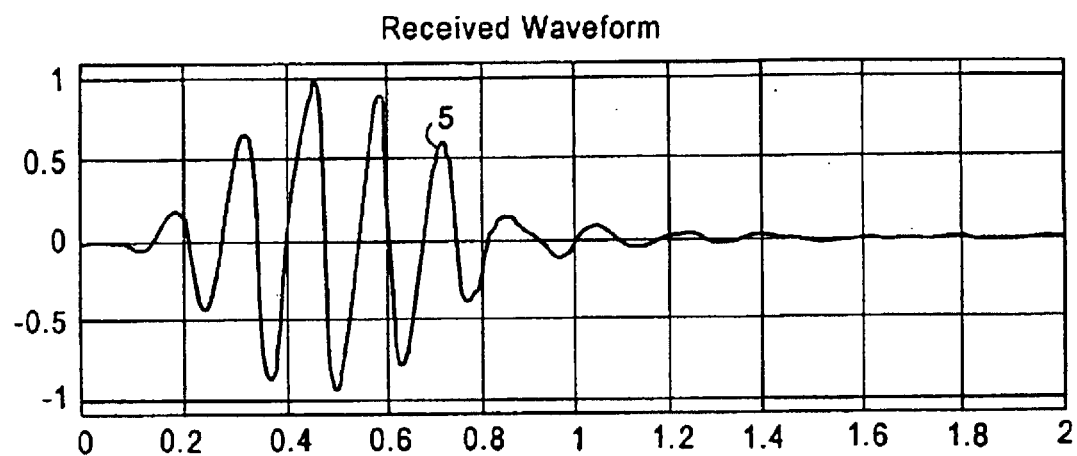
FIGS. 2A, 2B, 2C and 2D are diagrams illustrating processing of received waveforms by the physical layer transceiver of FIG. 1 according to an embodiment of the present invention.
Figure 2B:
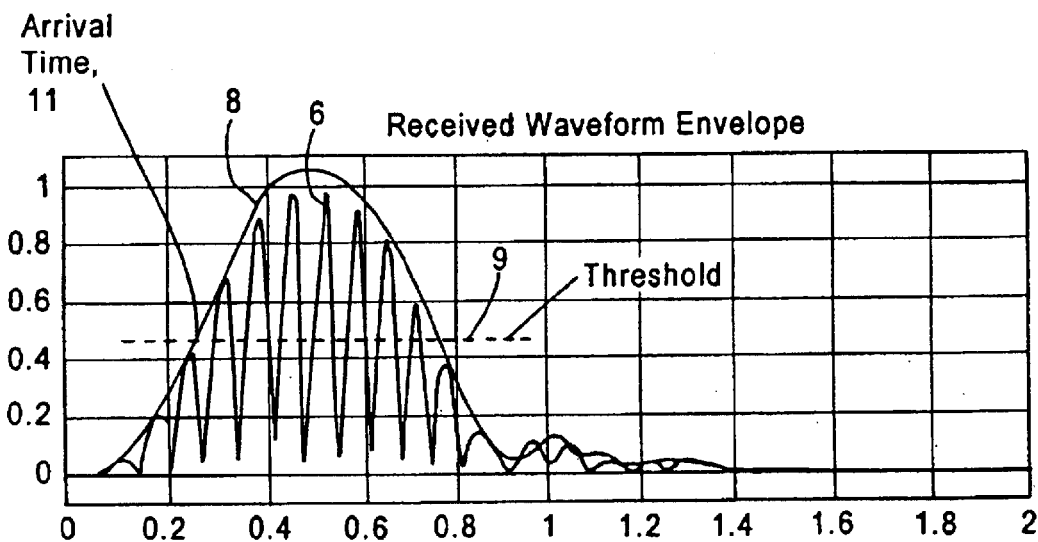

The stations 12a and 12b communicate by transmitting band-limited pulses that carry network data modulated in the analog network signals. In particular, the physical layer transmitter transmits a band-limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
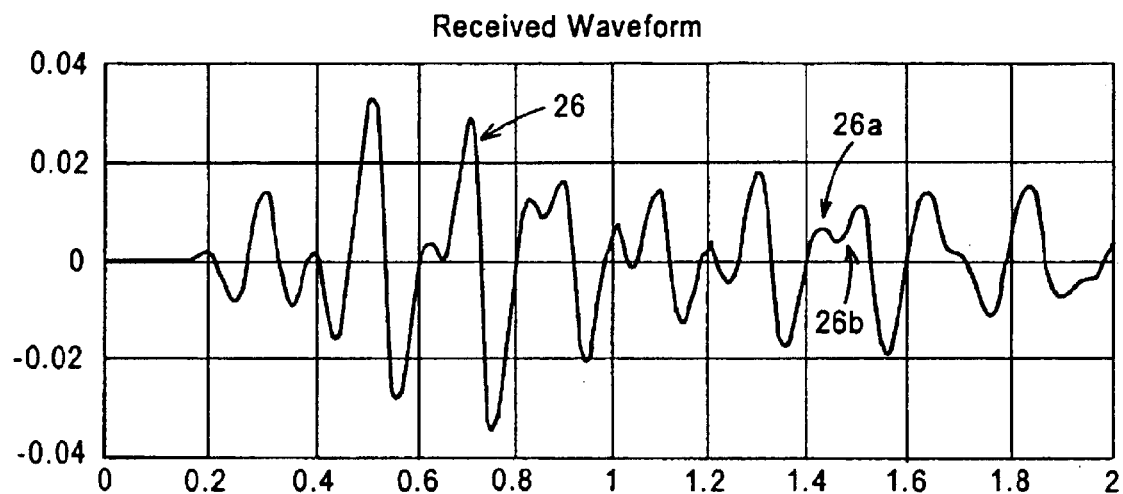
Figure 2D:
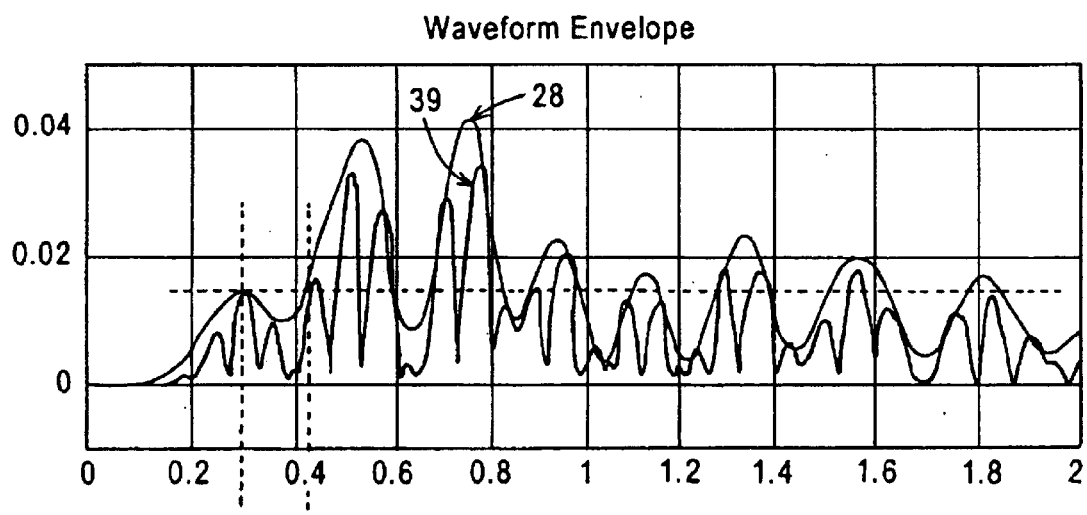

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26. Hence, if a threshold value is not properly set for detection of a data pulse, a slicing circuit may identify multiple pulse positions at which crosses a threshold level. As a result, a unique time value for the position of a received pulse may not be detected resulting in data recovery errors.

According to the disclosed embodiment, an adaptive physical layer transceiver architecture adaptively adjusts the signal processing circuitry on both the receive side and transmit side to optimize accurate recovery data from the transmitted network signals. In particular, the improvement of reception characteristics, for example, selecting an optimum gain of receiving circuits enables the transmitted data packet to be more reliably received by a receiving network station, reducing the bit error rate of received data packets.

Figure 3:
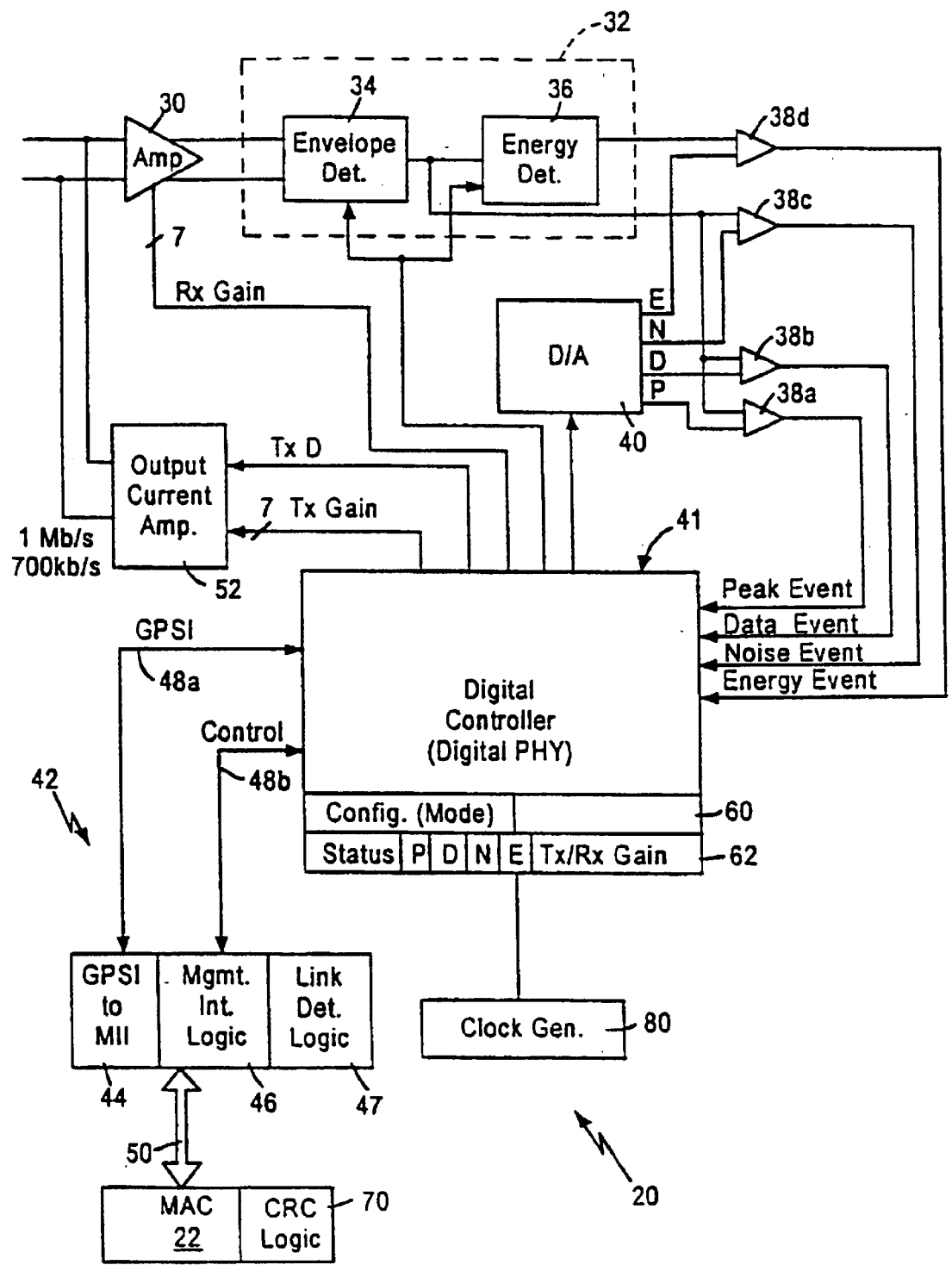
FIG. 3 is a block diagram illustrating the architecture of the physical layer transceiver of FIG. 1 according an embodiment of the present invention.

FIG. 3 is a block diagram of the physical layer transceiver 20 according to an embodiment of the present invention. As shown in FIG. 3, the physical layer transceiver 20 includes an input amplifier 30 for amplifying analog network signals received from the telephone medium, such as the network signals shown in FIG. 2C. The input amplifier 30 has a variable gain controlled by a 7-bit gain signal (RxGain) for amplifying received network signals. The physical layer transceiver 20 also includes a signal conditioning circuit 32 that includes an envelope detection circuit 34 and an energy detection circuit 36. The envelope detection circuit 34 is responsive to the amplified received signal 26 to generate the envelope signal 28. For example, the envelope detector 34 includes an absolute value circuit (e.g., a rectifier circuit) that generates an absolute value signal 39 representing the absolute value of the amplified received signal 26, and a low pass filter coupled to the rectifier circuit for filtering out high-frequency components of the rectified signal, resulting in the envelope signal 28. The envelope signal 28 is output from the envelope detector 34 and supplied to the energy detector 36. The energy detector 36 includes an integrator that performs the mathematical process of integration of the envelope signal 28 over time to produce a signal proportional to energy of the received pulse signal.

As shown in FIG. 3, physical layer transceiver 20 also includes slicer circuits 38a, 38b, 38c and 38d, and a digital to analog (D/A) converter 40 for supplying analog threshold signals to the slicer circuits 38. The physical layer transceiver 20 also includes a digital controller 41 configured for controlling the digital analog converter 40 to output threshold signals supplied to the slicer circuits 38.

The digital controller 41 is configured for controlling the threshold values applied to the slicers 38a, 38b, 38c and 38d based on the signals supplied by the slicers 38 to the digital controller 41. In particular, slicer circuit 38a outputs a peak event signal indicating with respect to time whether the envelope signal 28 exceeds a peak threshold (P) supplied by the digital to analog converter 40 under the control of the digital controller 41. Slicer circuits 38b and 38c output data event signals and noise event signals indicating with respect to time whether the envelope signal 28 exceeds a data transition threshold (D) and a noise threshold (N), respectively. The slicer circuit 38d outputs an energy event signal indicating with respect to time whether the energy signal output by energy detector 36 exceeds an energy threshold (E) supplied by the D/A converter 40.

Hence, the slicer circuits 38a, 38b, and 38c output peak, data transition, and noise event signals indicating with respect to time whether the envelope signal 28 exceeds a peak threshold (P), a data transition threshold (D), and a noise threshold (N), respectively. Slicer 38d outputs an energy event signal indicating with respect to time whether the energy signal from the energy detector 36 exceeds an energy threshold (E).

The digital controller 41 controls the noise, peak, data transition and energy thresholds based on the noise event signals and the peak event signals output by the slicers 38c and 38a, respectively, and produces a digital data signal based on the arrival position of the received pulse detected using either the energy event signal or the data event signal. The digital data signal is output to the media access controller 22 via a media independent interface (MII) 50.

The digital controller 41 adaptively controls the gain of the energy detector 36 during an access identification (AID) interval. According to the disclosed embodiment, AID replaces the preamble conventionally used in 10 Base-T Ethernet (IEEE 802.3) systems. AID is a specific identifier, which is unique for each network station 12. For example, AID may be a series of 8 pulses output from the PHY transceiver 20 of the transmitting station onto the telephone medium 14, where the time intervals between the first pulse and the successive 7 pulses define respective values. For instance, assume a second pulse is output by the PHY transceiver 20 following a first pulse after time interval T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values representing time intervals T2, T3, T4, T5, T6 and T7 between the first pulse and each of the 6 pulses following the second pulse. Hence, the presence of the valid AID can be determined by detecting a first pulse, and detecting a presence of 7 successive pulses using detection windows having predetermined duration, for example, 128 clock cycles.

The physical layer transceiver 20 also includes a transmitter portion 52 (e.g., an output current amplifier), that converts transmit data (TxD) produced by the digital controller 41 to an analog network signal. The analog network signal is output at a selected one of 128 output gain values based on the 7-bit transmit gain (TxGain) signal output by the digital controller 41.

Further, the physical layer transceiver 20 comprises an output interface 42 including a Media-Independent Interface (MII) to general purpose serial interface (GPSI) converter 44, management interface logic 46, and buses 48a and 48b. The bus 48a transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48a.

The output interface 42 also includes a control data bus 48b for transferring configuration data and status information between the digital converter 41 and the management interface logic 46. In particular, the management interface logic 46 is configured for storing configuration data, received from the MAC 22 via the MII 50, into the digital controller 41 at selected control registers 60. Note that the threshold value E for the energy detector slicer circuit 38d may be supplied by the management agent via the MII 50 and set in the configuration registers 60. The digital controller 41 also comprises status registers 62 that include, for example, the threshold values for the threshold signals P, D, and E, and the 7-bit input and output amplifier gain control signals (RxGain, TxGain).

The output interface 42 also includes link detection logic 47 for determining whether a valid link is detected on the network medium 14. If no valid AID is detected within three successive detection intervals, each having a preferred duration of about 800 milliseconds, the link status is sent to an invalid state. A valid AID may be either a link packet or a preamble for a data packet.

As discussed above, the AID interval may be used for adjusting reception characteristics of the physical layer transceiver 20. In particular, in accordance with the present invention, the gain of the energy detector 36 is adaptively controlled during the AID interval of every data packet received by the transceiver 20.

Figure 4:
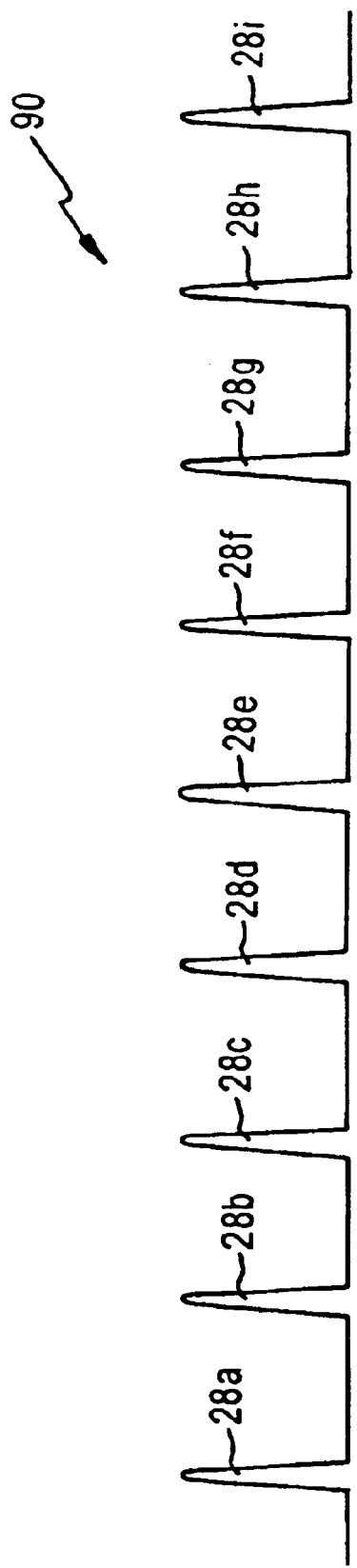
FIG. 4 is a diagram illustrating the access identification interval of the present invention.

As shown in FIG. 4 that illustrates a sequence of envelope pulses 28 used to define an AID interval 90, eight AID envelope pulses 28a, 28b, 28c, 28d, 28e, 28f, 28g and 28h are inserted before the data packet, which begins with the envelope pulse 28i contiguously following the last AID envelope pulse 28h. As described above, the envelope pulses 28 are generated by the envelope detector 34 in response to received network signals 5. The AID envelope pulses 28 supplied to the energy detector 36 are used to adaptively control its gain for each data packet received from the network.

In response to an envelope pulse 28, the energy detector 36 produces a pulse energy signal representing the energy of the received pulse signal. As discussed above, the energy detector 36 includes an integrator that performs the mathematical process of integration over time to produce a pulse energy value proportional to energy of the received pulse signal. As the shape of the waveform in home network environment depends largely on the wiring topology, the amplitude of envelope pulses 28 supplied to the input of the energy detector 36 may vary over a wide range. Accordingly, pulse energy values produced by the energy detector 36 may be higher than a value corresponding to the maximum level of the reception dynamic range causing saturation of the receiver, or may be lower than a level required to distinguish data signals from noise signals.

Therefore, it would be desirable to adjust the gain of the energy detector so as to maintain its output value at a pre-set optimum level corresponding, for example, to the maximum value of the reception dynamic range. To perform such an adjustment, a pulse energy value produced by the energy detector 36 in response to an AID envelope pulse 28 is compared by the slicer circuit 38d with a preset energy detect test level established by the digital controller 41. The D/A converter 40 transforms the digital value of the energy detect test level into an analog signal supplied to the slicer circuit 38d. The output of the slicer circuit 38d is provided to the digital controller 41. If the pulse energy value is higher than the preset energy detect test level, the digital controller 41 produces an energy detector gain control signal that reduces the gain of the energy detector 36. However, if the pulse energy value is lower than the preset energy detect test level, the energy detector gain control signal produced by the digital controller 41 increases the gain of the energy detector 36.

For example, the integrator of the energy detector 36 may comprise a capacitor fed with current supplied by a current source. To adjust the gain of the energy detector 36, the current source may be controlled by the energy detector gain control signal so as to change the value of current supplied to the capacitor. As a result, the value of an integrated signal produced by the integrator can be adjusted.

Figure 5:
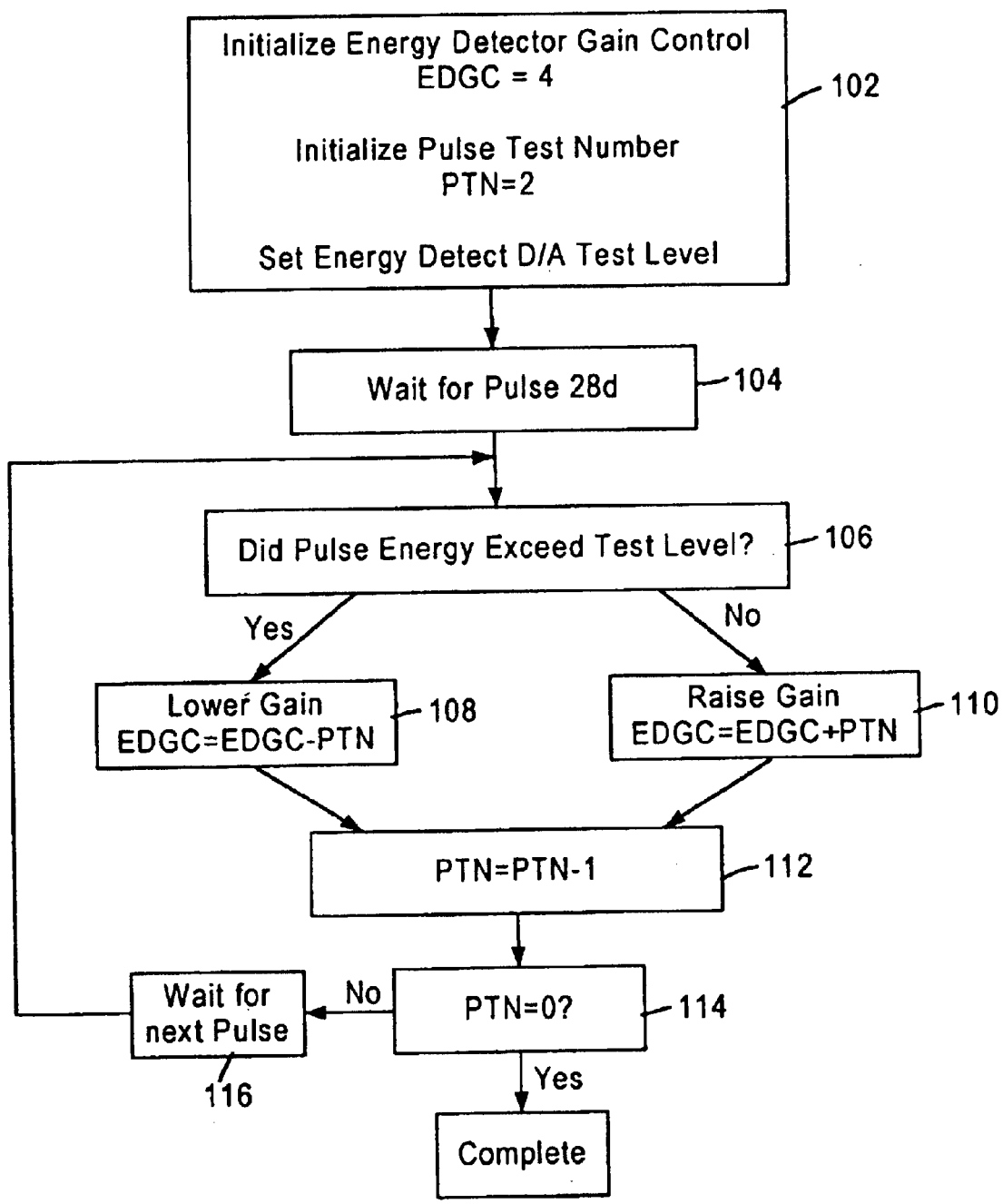
FIG. 5 is a flow diagram illustrating a method of adaptively controlling the gain of the energy detector of FIG. 3 according to an embodiment of the present invention.

In accordance with the disclosed embodiment, a binary search may be employed for setting the energy detector gain control value at an optimum level. As shown in FIG. 5 that illustrates the adaptive energy detector gain control procedure of the present invention, at the beginning of a data communication session, the digital controller 41 initializes the energy detector gain control (EDGC) value supplied to the energy detector 36 to control its gain (block 102). For example, when a 3-bit energy detector gain control value is employed, the digital controller 41 may initially set the energy detector gain control value to EDGC=4 (binary 100). Hence, the EDGC may be initially set to about the middle of the energy detector gain control range (from binary 000 to binary 111).

Also, the digital controller 41 initializes a pulse test number (PTN) that defines the maximum number of iterations in the successive approximation algorithm used for the energy detector gain adjustment and may determine the increment for the adjustment procedure. For example, the pulse test number may be initially set to PTN=2 to perform up to 3 iterations (from PTN=2 to PTN=0).

In addition, the digital controller 41 sets an energy detect test level used as a threshold for energy detector gain control. For example, the energy detect test level may be set to a level corresponding to the maximum value of the dynamic range (i.e., linear region) of the physical layer transceiver 20.

Then, the digital controller 41 waits until a predetermined AID pulse is received (block 104). For example, the digital controller 41 may wait until the fourth AID envelope pulse 28d (FIG. 4) is supplied to the energy detector 36.

The pulse energy value produced by the energy detector 36 in response to the pulse 28d is compared by the slicer circuit 38d with the energy detect test level (block 106). If the digital controller 41 detects that the pulse energy value exceeds the test level, it lowers the gain of the energy detector 36 by reducing the gain control value supplied to the energy detector 36. (block 108). For example, the digital controller 41 may reduce the EDGC value by the PTN value.

If the pulse energy value produced in response to the pulse 28d is less than the energy detect test level, the digital controller 41 raises the gain of the energy detector 36 by increasing the EDGC value (block 110). For example, the EDGC value may be increased by the PTN value.

Then, the PTN is decremented by one (block 112), and the digital controller 41 determines whether the new PTN value is equal to 0 (block 114). If not, the system waits for the next AID pulse, for example, pulse 28e (block 116). The pulse energy value produced by the energy detector 36 in response to the pulse 28e is compared by the slicer circuit 38d with the energy detect test level, and step 108 or 110 is repeated depending on whether the pulse energy value is higher or lower than the test level.

The energy detector gain control procedure is performed until the digital controller in step 114 detects that PTN=0. Thus, in accordance with the disclosed embodiment, AID pulses 28d, 28e and 28f are used for adaptively controlling the gain of the energy detector 36.

Hence, during the AID interval of every data packet received from the network, the physical layer transceiver 20 of the present invention adaptively adjusts the gain of the energy detector 36 to an optimum level, for example, corresponding to the maximum level of the reception dynamic range.

Those skilled in the art will recognize that the present invention admits of a number of modifications, within the spirit and scope of the inventive concepts. For example, the energy detector gain control procedure may be implemented in a number of different ways. For example, it may be implemented using a digital signal processor and appropriate programming. Also, the energy detector gain control value may be initially set to the maximum level, and then adaptively reduced to a desired optimum level.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A network station for receiving data via residential wiring, comprising:
    an input circuit for receiving an incoming pulse signal,
    an energy detector responsive to the incoming pulse signal for producing a pulse energy value representing energy of the incoming pulse signal, and
    an adaptive energy detector gain control circuit responsive to the pulse energy value for adaptively controlling gain of the energy detector so as to maintain the pulse energy value at a predetermined level.

2. The network station of claim 1, wherein the adaptive energy detector control circuit is configured to control the gain of the energy detector during an access identification time interval preceding an incoming data packet.

3. The network station of claim 1, wherein each packet received by the input circuit comprises a plurality of access identification pulses preceding data pulses to identify a transmitting network station.

4. The network station of claim 3, wherein the adaptive energy detector gain control circuit is configured to control the gain of the energy detector in response to at least one of the access identification pulses.

5. The network station of claim 4, wherein the adaptive energy detector gain control circuit comprises a comparator for comparing a pulse energy value produced by the energy detector in response to the at least one of the access identification pulses, with a preset threshold level.

6. The network station of claim 5, wherein the adaptive energy detector gain control circuit further comprises a controller for supplying the energy detector with a gain control value for controlling the gain of the energy detector.

7. The network station of claim 6, wherein the controller is responsive to the output of the comparator for reducing the gain of the energy detector if the pulse energy value exceeds the threshold level, and for raising the gain of the energy detector if the pulse energy value is less than the threshold level.

8. The network station of claim 1, wherein the energy detector comprises an integrator for performing integration over time.

9. The network station of claim 8, wherein the energy detector gain control circuit is configured to adjust a value of an integrated signal produced by the integrator.

10. The network station of claim 1, wherein the input circuit comprises an envelope detector for producing an envelope pulse signal representing an envelope of the incoming pulse signal.

11. The network station of claim 10, wherein the energy detector is configured for performing integration of the envelope pulse signal to produce the pulse energy value.

12. A method of receiving data via residential wiring, comprising the steps of:

producing by an energy detector a pulse energy value representing energy of an incoming pulse signal, and adaptively controlling gain of the energy detector in response to the produced pulse energy value so as to maintain the pulse energy value at a predetermined level.

13. The method of claim 12, wherein the step of adaptively controlling the gain of the energy detector is performed during an access identification time interval preceding an incoming data packet.

14. The method of claim 12, wherein an incoming packet comprises a plurality of access identification pulses preceding data pulses to identify a transmitting network station.

15. The method of claim 14, wherein the gain of the energy detector is adaptively controlled in response to at least one of the access identification pulses.

16. The method of claim 15, wherein the step of adaptively controlling the gain of the energy detector comprises comparing a pulse energy value produced by the energy detector in response to the at least one of the access identification pulses, with a preset threshold level.

17. The method of claim 16, wherein the gain of the energy detector is reduced if the pulse energy value exceeds the threshold level, and the gain of the energy detector is raised if the pulse energy value is less than the threshold level.

18. The method of claim 12, wherein the step of adaptively controlling the gain comprises adjusting a value of an integrated signal produced in the energy detector.

19. The method of claim 12, further comprising the step of supplying the energy detector with an envelope pulse signal representing an envelope of the incoming pulse signal.

20. The method of claim 19, further comprising the step of performing integration of the envelope pulse signal to produce the pulse energy value.

\* \* \* \* \*